United States Patent [19]

Atumaru

[11] 4,404,870
[45] Sep. 20, 1983

[54] RECIPROCATOR FOR PAINT GUN

[76] Inventor: Ayakazu Atumaru, 3-21 kajihara 2-Chome, Takatsuki-Shi, Osaka-Fu, Japan

[21] Appl. No.: 274,786

[22] Filed: Jun. 18, 1981

[51] Int. Cl.³ .................... F16H 35/08; F16H 19/06
[52] U.S. Cl. .................... 74/829; 74/833; 74/37; 74/108
[58] Field of Search .......... 74/25, 37, 108, 99 R, 74/828, 829, 831, 833

[56] References Cited

U.S. PATENT DOCUMENTS

| | | | |
|---|---|---|---|
| 3,266,216 | 8/1966 | Van Den Bos | 74/108 |
| 3,274,860 | 9/1966 | Gauthier et al. | 74/829 |
| 3,780,595 | 12/1973 | Tuss | 74/25 |
| 4,281,556 | 8/1981 | Weishew | 74/828 |

FOREIGN PATENT DOCUMENTS

| | | | |
|---|---|---|---|
| 55-115650 | 9/1980 | Japan | 74/828 |
| 24199 | 10/1909 | United Kingdom | 74/833 |

*Primary Examiner*—Lawrence J. Staab
*Attorney, Agent, or Firm*—Harding, Earley, Follmer & Frailey

[57] ABSTRACT

A reciprocator is provided with fixed pulleys and movable pulleys which are reciprocated upward and downward, and a slider for mounting a paint gun is connected to an end of a wire which is led through the fixed pulleys and the movable pulleys.

3 Claims, 5 Drawing Figures

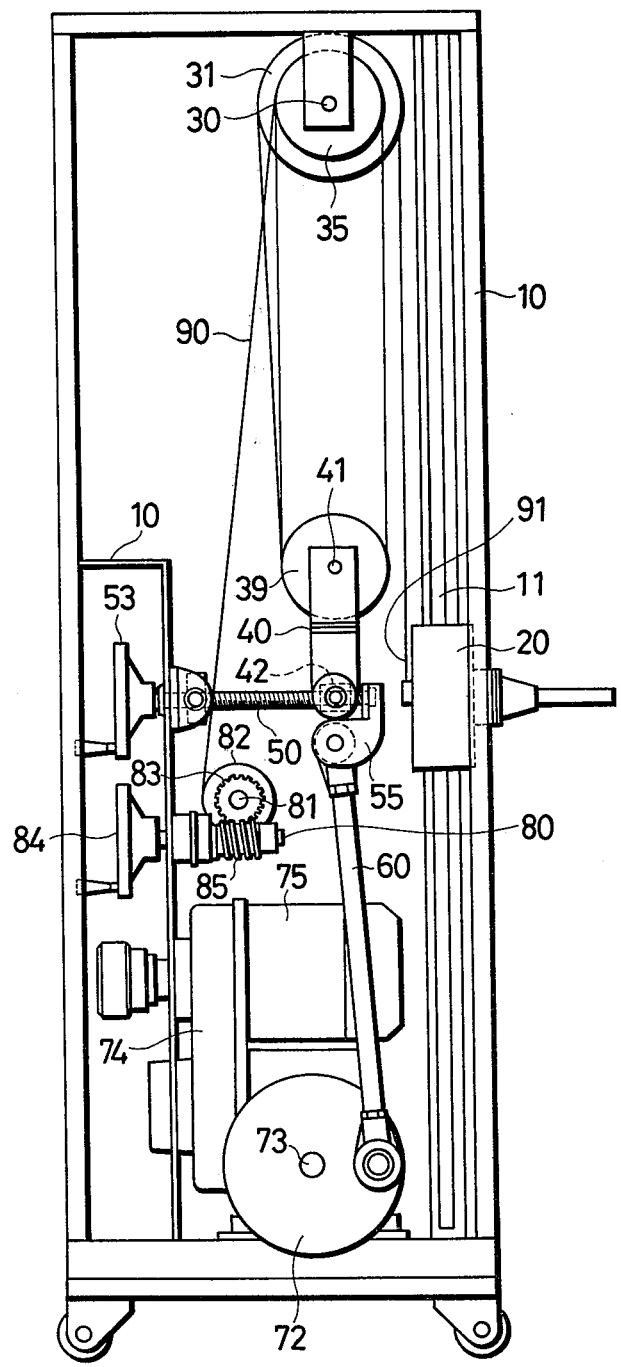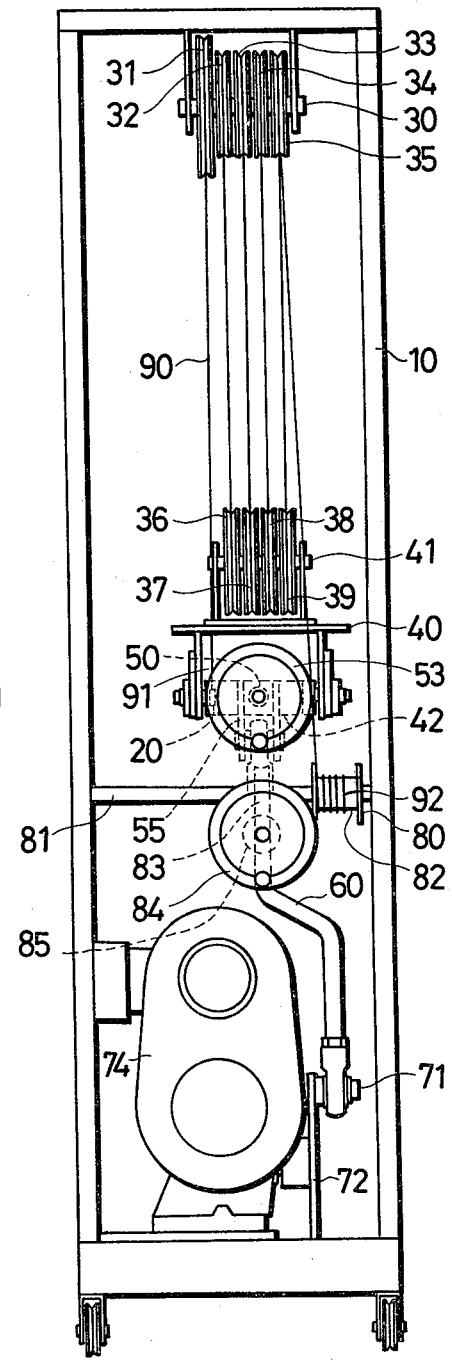
FIG. 1
FIG. 2

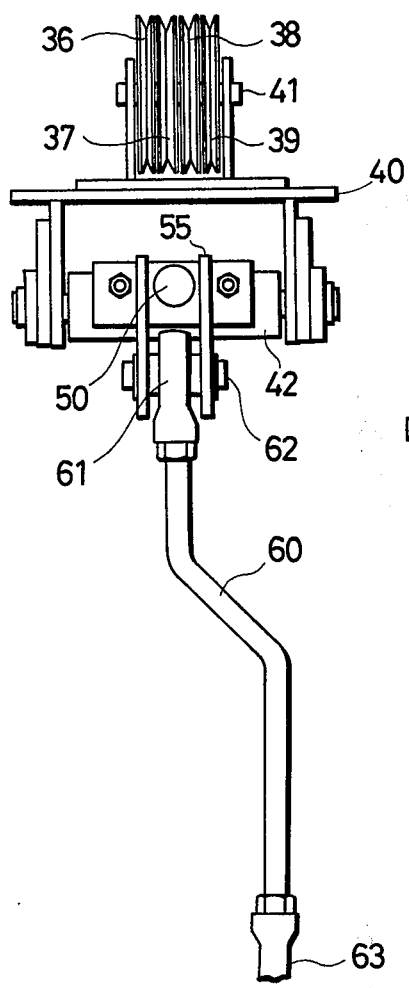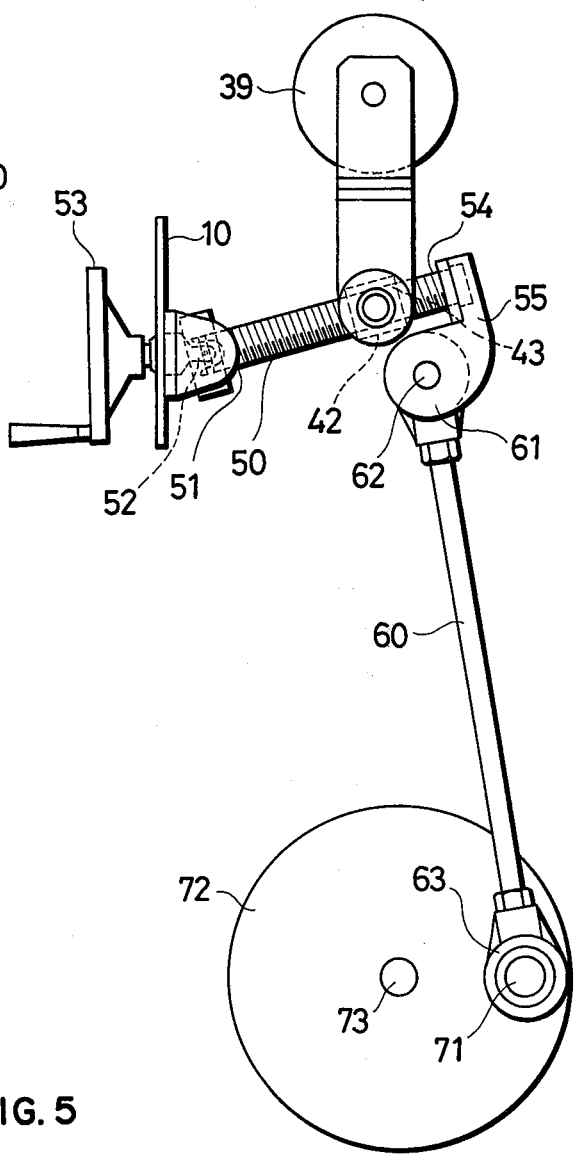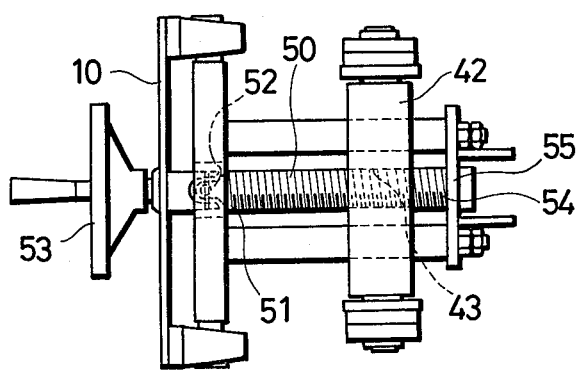

RECIPROCATOR FOR PAINT GUN

The present invention relates to a reciprocator which is capable of reciprocating a paint gun upward and downward.

Formerly, there were several reciprocators, in one of which a slider for mounting a paint gun was slidably engaged with an upright rail fixed on a frame and reciprocated upward and downward by means of an endless chain, and in another one of which a slider was connected to a piston-rod of an air-cylinder and reciprocated, said air-cylinder operated by means of limit switches.

However, as to the former, it was difficult to change the length of a stroke of the slider and the position of the center of the stroke, and further there was a defect of making big noises. As the latter, although it was possible to change the length of a stroke of the slider and the position of the center of the stroke, because the limit switches were capable of being moved, it was impossilbe to slightly adjust the length of the stroke and the position of the center of the stroke. Further, there were such defects return movement of the slider could not be done smoothly and the limit switches were liable to be damaged.

An object of the present invention is to provide a reciprocator for paint gun, in which a wire and pulleys have been used for moving a slider and the slider is extremely smoothly reciprocated, and which does not make noises.

Another object of the present invention is to provide a reciprocator for paint gun, in which no limit switches have been used, and in which changes of the length of a stroke of the slider and the position of the center of the stroke are easily carried out.

Further objects of the present invention will be apparent from annexed drawings and following detailed description.

FIG. 1 is a side view showing a reciprocator for paint gun according to the present invention.

FIG. 2 is a back view of the reciprocator shown in FIG. 1, in which some parts are omitted.

FIGS. 3–5 are enlarged view, each showing a part of a mechanism for adjusting the length of a stroke of a slider.

A preferred embodiment of the invention will be explained with reference to FIGS. 1 to 5 inclusive.

A slider 20 is adapted to be capable of mounting a paint gun releasably, and slidably engaged with an upright rail 11 fixed on a frame 10. Five fixed pulleys 31, 32, 33, 34 and 35 are rotatably supported at an upper portion of the frame 10 by means of a common shaft 30. A bracket 40 supports four movable pulleys 36, 37, 38 and 39 by means of a common shaft 41, and also pivotably supports both ends of a movable rod 42. A threaded rod 50 is threadably engaged with a threaded hole 43 of the movable rod 42, and one end 51 of the rod 50 is connected via a universal joint 52 to an axis of a handle 53, which is rotatably supported on the frame 10, while the other end 54 of the rod 50 is rotatably connected to one end of a connecting piece 55. As to a connecting rod 60, one end 61 of the rod 60 is pivotably connected to the other end of the connecting piece 55 by means of a pin 62, while the other end 63 of the rod 60 is pivotably connected to a crank-pin 71. The crank-pin 71 is eccentrically fixed on a disk 72, and a center axis 73 of the disk 72 is connected to a motor 75 via a reduction gear 74.

A winch device 80 comprises a drum 82 rotatably supported on a fixed shaft 81 at a middle portion of the frame 10, a worm wheel 83 rotated together with the drum 82, and a worm 83 directly connected to an axis of a handle 84 which is rotatably supported on the frame 10, and engaged with the worm wheel 83. One end 91 of a wire 90 is fixed on the slider 20, and the wire 90 is led through the first fixed pulley 31, the first movable pulley 36, the second fixed pulley 32, the second movable pulley 37, the third fixed pulley 33, the third movable pulley 38, the fourth fixed pulley 34, the fourth movable pulley 39 and the fifth fixed pulley 35 in turn, and wound on to the drum 82. The other end 92 of the wire 90 is fixed on the drum 92.

Next, with regard to an operation of the reciprocator according to the present invention, explanation will be given.

When the motor 75 is started, the disk 72 is rotated via the reduction gear 74. The power of the motor 75 is transmitted to the bracket 40 by means of the connecting rod 60, and then the bracket 40 is reciprocated upward and downward. When the bracket 40 ascends, the four movable pulleys 36, 37, 38 and 39 on the common shaft 41 also ascend, and the slider 20 descends a distance equal to a slack of the wire 90. When the bracket 40 descends, the slider 20 is pulled by the wire 90 and ascends. Accordingly, when a paint gun (not shown) is mounted on the slider 20, the paint gun reciprocates upward and downward and can paint objects to be painted while passing by in front of the objects.

The stroke of the slider 20 is much longer than the stroke of the bracket 40, because of the mechanism of pulley block. Further, the stroke of the slider 20 can be increased or decreased in proportion to the number of the sum of the fixed pulleys and the movable pulleys. Further, the stroke of the slider 20 can be precisely adjusted even while in motion by changing of the position of the movable rod 42 in relation to the threaded rod 50, because the movable rod 42 is capable of being moved by turning of the threaded rod 50, which is turned by the handle 53. Also it is possible to adjust slightly the stroke. In other words, when the bracket 40 approaches to the handle 53 together with the movable rod 42, which is moved by means of the threaded rod 50, the stroke of the bracket 40 becomes short and the stroke of the slider 20 also becomes short in proportion to the stroke of the bracket 40. On the other hand, when the bracket 40 approaches to the connecting piece 55, the stroke of the bracket 40 becomes long and the stroke of the slider 20 also becomes long in proportion to the stroke of the bracket 40.

Changes of the position of the center of the stroke of the slider 20 can be freely done by turning of the handle 84 even while in motion. In other words, the position of the center of the stroke ascends when the effective length of the wire 40 is shortened by turning of the drum 82, which is turned by means of the worm 85 and the worm wheel 83, while the position of the center of the stroke descends when the effective length of the wire 40 is elongated.

The reciprocator according to the present invention comprises the pulley block mechanism. Therefore, the reciprocating motion of the slider is smoothly performed and does not make noises. Further, the reciprocator can be produced at a low price.

What is claimed and desired to be secured by Letters Patent is:

1. A reciprocator for paint gun comprising a slider for mounting a paint gun, said slider slidably engaged with an upright rail fixed on a frame so that the slider may be capable of ascending and descending along the rail, fixed pulleys rotatably supported at an upper portion of the frame, movable pulleys rotatably supported on a common shaft below said fixed pulleys, the number of said movable pulleys being one less than the number of said fixed pulleys, a bracket for mounting said common shaft and supporting a movable rod, said movable rod having a threaded hole, a threaded rod threadably engaged with said threaded hole, one end of said threaded rod connected via a universal joint to a handle rotatably supported on the frame, and the other end of said threaded rod connected to one end of a connecting piece, a connecting rod having one end pivotably connected to the other end of said connecting piece and the other end pivotably connected to a crank pin, a winch device having a drum rotatably supported at a middle portion of the frame, said drum adapted to be rotated by means of a handle, and a wire led from said slider to said drum through said fixed and movable pulleys, said wire having its ends fixed on said slider and said drum.

2. A reciprocator for paint gun as claimed in claim 1, wherein said winch device further comprises a worm wheel combined in a body with said drum, a worm engaged with said worm wheel, said worm rotatably supported on the frame, and a handle for rotating said worm.

3. A reciprocator for paint gun as claimed in claim 1, wherein said crank-pin is eccentrically fixed on a disk and the center axis of said disk is connected to a motor via a reduction gear.

* * * * *